UNITED STATES PATENT OFFICE.

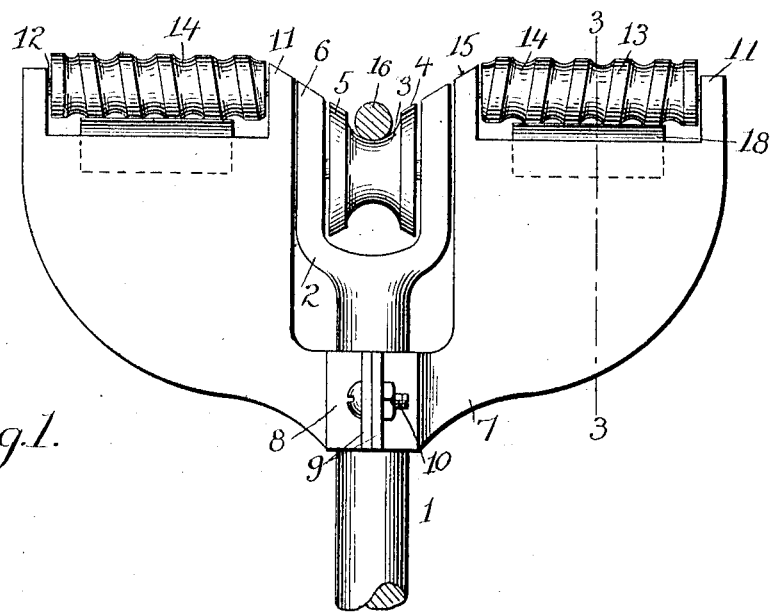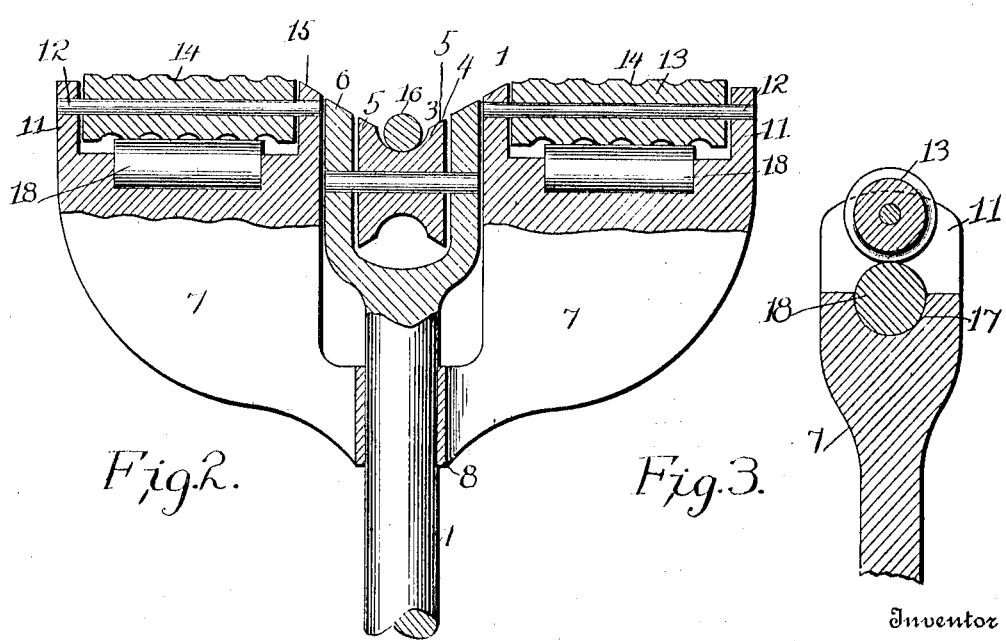

BEN H. HAWKINS, OF BROOKS, OREGON.

TROLLEY-WHEEL.

1,055,275.  Specification of Letters Patent.  Patented Mar. 4, 1913.

Application filed February 24, 1912. Serial No. 679,680.

*To all whom it may concern:*

Be it known that I, BEN H. HAWKINS, a citizen of the United States, residing at Brooks, in the county of Marion, State of Oregon, have invented certain new and useful Improvements in Trolley-Wheels; and I do hereby declare the following to be a full, clear, and exact description of the invention, such as will enable others skilled in the art to which it appertains to make and use the same.

This invention is directed to improvements in trolley wheels, and has for its object to produce a wheel with means for automatically guiding the trolley wire to the collector wheel should the same be displaced.

A further object of the invention is to produce a trolley wheel having laterally extending members which will positively guide the trolley wire to the main or collector wheel so that the conductor may easily and quickly position the trolley harp and its parts without the necessity of centering the main or collector wheel, as is usual in the ordinary trolley wheel.

With these and other objects in view, the invention consists in certain novel features of construction, combination and arrangement of parts as will be hereinafter fully described and claimed.

In the drawing: Figure 1 is a side elevation of the trolley harp showing the same equipped with the laterally extending wire guiding members. Fig. 2 is a longitudinal sectional view of the invention. Fig. 3 is a sectional view on line 3—3 of Fig. 1.

Referring to the drawing, the numeral 1 designates the trolley pole having the harp 2 formed at its upper end for supporting the trolley wheel 3. The trolley wheel 3 has its side flanges 4 formed with beveled peripheries 5 which are arranged at an inclination with the beveled upper ends 6 of the harp 2. The device further consists of a pair of brackets 7 having their lower ends formed with curved plates 8, which conform to the usual curvature of the trolley pole 1. Each plate is provided with a pair of lateral extensions 9, and through which clamping bolts 10 are passed. The plates 8 when confronting form, in effect, a collar for clampingly engaging the pole 1.

The upper ends of the brackets are provided with spaced ears 11 and are formed with suitable bearings for receiving the journals 12 of the guide members 13. The guide members 13 are formed with spiral grooves 14 which are inclined in a direction to guide the trolley wire to the trolley wheel 3. The inner ears 11 of the brackets 7 have beveled upper edges 15, the same being arranged upon an inclined plane with the beveled upper ends of the trolley harp 2 and the beveled peripheries of the trolley wheel 3. Thus it will be seen that when the trolley wire 16 rests within the groove of either one of the guide members 13, the forward movement of the car carrying the pole will cause the same to move inwardly, whereupon it will pass from the groove 14 and freely travel over the beveled ends of the harp and ear 15, and from thence over the beveled periphery of the trolley wheel to the groove thereof.

Formed in the brackets 7, and between the ears 11 are semicircular recesses 17, said recesses being for the purpose of rotatably mounting roller bearings 18, the diameter of which being such that the curved faces thereof will rest against the guide members 13, thus strengthening the same, but at the same time allowing the guide members to freely rotate.

It is desirable that the guide members 13 should be constructed in a manner which does not impart or add weight to the trolley pole, but at the same time said guides should be of sufficient strength to withstand the hard usage incident to the replacing of the trolley wire 16 in the trolley wheel 3, when the same has left the wire.

What is claimed is:

In combination with a trolley pole and its harp, of trolley wheels rotatably supported by the harp, said trolley wheel having its side flanges beveled, said harp having its upper ends beveled, brackets adapted to be clamped to the pole and having their upper ends formed with spaced ears, guide members rotatably supported by said ears and being provided with spiral grooves, the inner ears of each bracket having their upper ends beveled and arranged on a common inclined plane with the side flanges of the trolley wheel and upper ends of the harp, whereby a trolley wire may pass freely from the guide members to the trolley wheel.

In testimony whereof, I affix my signature, in presence of two witnesses.

BEN H. HAWKINS.

Witnesses:
RAY ASPINWALL,
CHARLIE HAWKINS.

Copies of this patent may be obtained for five cents each, by addressing the "Commissioner of Patents, Washington, D. C."